United States Patent
Palmas et al.

(10) Patent No.: US 10,399,022 B2
(45) Date of Patent: Sep. 3, 2019

(54) APPARATUS FOR SEPARATING PARTICULATE SOLIDS

(71) Applicant: UOP LLC, Des Plaines, IL (US)

(72) Inventors: Paolo Palmas, Des Plaines, IL (US); Michael S. Sandacz, Glen Ellyn, IL (US)

(73) Assignee: UOP LLC, Des Plaines, IL (US)

( * ) Notice: Subject to any disclaimer, the term of this patent is extended or adjusted under 35 U.S.C. 154(b) by 388 days.

(21) Appl. No.: 15/240,229

(22) Filed: Aug. 18, 2016

(65) Prior Publication Data

US 2017/0056799 A1 Mar. 2, 2017

Related U.S. Application Data

(60) Provisional application No. 62/209,486, filed on Aug. 25, 2015.

(51) Int. Cl.
*B01D 45/12* (2006.01)
*B01D 45/16* (2006.01)
(Continued)

(52) U.S. Cl.
CPC ............ *B01D 45/16* (2013.01); *B01D 45/02* (2013.01); *B01D 45/12* (2013.01); *B04C 5/04* (2013.01);
(Continued)

(58) Field of Classification Search
CPC ........ B01D 45/16; B01D 45/12; B01D 45/02; B04C 5/103; B04C 5/04; C10G 11/18;
(Continued)

(56) References Cited

U.S. PATENT DOCUMENTS 2,535,140 A 12/1950 Kassel
4,397,738 A 8/1983 Kemp
(Continued)

FOREIGN PATENT DOCUMENTS

CA 1262103 10/1989

OTHER PUBLICATIONS

Guo, et al., "Impact of fast separator construction of FCC riser reactor on oil vapor residence time in disengage", Petroleum Refinery Engineering (2009), v 39, n. 7, p. 40-44.
(Continued)

*Primary Examiner* — Dung H Bui
(74) *Attorney, Agent, or Firm* — Paschall & Maas Law Office, LLC; James C. Paschall

(57) ABSTRACT

An apparatus for separating solid particles from a stream of a mixture of gaseous fluids and solid particles has a separation vessel. A mixture conduit extends vertically into a central section of the separation vessel and defines a discharge opening located within the vessel and tangentially oriented for discharging the stream into an open interior of the vessel and imparting a tangential velocity to the stream. A gas recovery conduit within the separation vessel has an inlet for withdrawing gaseous fluids from within the open interior of the separation vessel at a location below the discharge opening and radially offset from the mixture conduit. An intermediate portion of the gas recovery conduit is located above the inlet within the separation vessel and has a diameter greater than a diameter of the inlet.

12 Claims, 8 Drawing Sheets

(51) Int. Cl.
  *B04C 5/04* (2006.01)
  *B04C 5/103* (2006.01)
  *C10G 11/18* (2006.01)
  *B01D 45/02* (2006.01)
  *B01J 38/30* (2006.01)
  *B01J 8/00* (2006.01)

(52) U.S. Cl.
  CPC ............. *B04C 5/103* (2013.01); *C10G 11/18* (2013.01); *B01J 8/0055* (2013.01); *B01J 38/30* (2013.01); *C10G 2300/4093* (2013.01)

(58) Field of Classification Search
  CPC .. C10G 2300/4093; B01J 8/0055; B01J 38/30
  See application file for complete search history.

(56) References Cited

U.S. PATENT DOCUMENTS

| | | | |
|---|---|---|---|
| 4,482,451 A | 11/1984 | Kemp | |
| 4,670,410 A | 6/1987 | Baillie | |
| 4,701,307 A | 10/1987 | Walters et al. | |
| 4,725,410 A | 2/1988 | Krug et al. | |
| 4,792,437 A | 12/1988 | Hettinger, Jr. et al. | |
| 5,190,650 A * | 3/1993 | Tammera | B01J 8/0055 208/161 |
| 5,565,020 A | 10/1996 | Niewiedzial | |
| 6,010,618 A * | 1/2000 | Lomas | C10G 11/18 208/113 |
| 6,063,263 A * | 5/2000 | Palmas | B01J 8/006 208/113 |
| 6,692,552 B2 * | 2/2004 | Benham | B01D 45/12 208/161 |
| 6,841,133 B2 * | 1/2005 | Niewiedzial | B01J 8/0055 422/144 |
| 7,247,233 B1 * | 7/2007 | Hedrick | B01J 8/0055 208/113 |
| 8,349,170 B2 * | 1/2013 | Tammera | C10G 11/18 208/113 |
| 8,696,995 B2 | 4/2014 | Niccum et al. | |
| 2009/0107336 A1 * | 4/2009 | Mehlberg | B01D 45/08 95/271 |
| 2013/0172172 A1 * | 7/2013 | Gamas-Castellanos | B01J 8/26 502/34 |
| 2014/0148632 A1 * | 5/2014 | Mehlberg | B01J 38/12 585/653 |
| 2015/0167415 A1 * | 6/2015 | Leuchtenberg | E21B 33/038 137/14 |
| 2016/0045922 A1 * | 2/2016 | Umar | B01D 45/12 55/346 |
| 2016/0264890 A1 * | 9/2016 | Qafisheh | C10G 69/04 |

OTHER PUBLICATIONS

Kauff, et al., "Successful application of the MSCC [(Millisecond Catalytic Cracking)] process", NPRA 1996 Annual Meeting, National Petroleum Refiners Association, Published Mar. 17, 1996, Enquiry No. 32.

* cited by examiner

APPARATUS FOR SEPARATING PARTICULATE SOLIDS

CROSS-REFERENCE TO RELATED APPLICATION

This application claims priority from Provisional Application No. 62/209,486 filed Aug. 25, 2015, the contents of which are hereby incorporated by reference.

DESCRIPTION

Technical Field

The invention relates to fluid catalytic cracking; more particularly, the present invention relates to a vortex separation riser disengager in a process that employs fluid catalytic cracking.

Background of the Invention

Cyclonic methods for the separation of solids from gases are well known and commonly used. A particularly well known application of such methods is in the hydrocarbon processing industry where particulate catalysts contact gaseous reactants to effect chemical conversion of the gas stream components or physical changes in the particles undergoing contact with the gas stream.

A fluid catalytic cracking (FCC) process presents an example of a process that uses gas stream to contact a finally divided stream of catalyst particles and effects contact between the gas and the particles. The FCC processes, as well as separation devices used therein are fully described in U.S. Pat. Nos. 4,701,307 and 4,792,437, the contents of which are hereby incorporated by reference.

The most common method of separating particulate solids from a gas stream uses a cyclonic separation. Cyclonic separators are well known and operate by imparting a tangential velocity to gases containing entrained solid particles that forces the heavier solid particles outwardly away from the lighter gases for upward withdrawal of gases and downward collection of solids. Cyclonic separators usually comprise relatively small diameter cyclones having a tangential inlet on the outside of a cylindrical vessel that forms the outer housing of the cyclone.

Cyclones for separating particulate material from gaseous materials are well known to those skilled in the art of FCC processing. In the operation of an FCC cyclone, tangential entry of the gaseous materials and catalyst creates a spiral flow path that establishes a vortex configuration in the cyclone so that the centripetal acceleration associated with an outer vortex causes catalyst particles to migrate towards the outside of the barrel while the gaseous materials enter an inner vortex for eventual discharge through an upper outlet. The heavier catalyst particles accumulate on the side wall of the cyclone barrel and eventually drop to the bottom of the cyclone and out via an outlet and a dip leg conduit for recycle through the FCC arrangement. Cyclone arrangements and modifications thereto are generally disclosed in U.S. Pat. Nos. 4,670,410 and 2,535,140.

The FCC process is representative of many processes for which methods are sought to quickly separate gaseous fluids and solids as they are discharged from a conduit. In the FCC process one method of obtaining this initial quick discharge is to directly connect a conduit containing a reactant fluid and catalyst directly to a traditional cyclone separator. While improving separation, there are drawbacks to directly connecting a conduit discharging a mixture of solids and gaseous fluids into cyclone separators. Where the mixture discharged into the cyclones contains a high loading of solids, direct discharge requires large cyclones. In addition, instability in the delivery of the mixture may also cause the cyclones to function poorly and to disrupt the process where pressure pulses cause an unacceptable carryover of solids with the vapor separated by the cyclones. Such problems are frequently encountered in processes such as fluidized catalytic cracking. Accordingly, less confined systems are often sought to effect an initial separation between a mixture of solid particles and gaseous fluids.

U.S. Pat. Nos. 4,397,738 and 4,482,451, the contents of which are hereby incorporated by reference, disclose an alternate arrangement for cyclonic separation that tangentially discharges a mixture of gases and solid particles from a central conduit into a containment vessel. The containment vessel has a relatively large diameter and generally provides a first separation of solids from gases. This type of arrangement differs from ordinary cyclone arrangements by the discharge of solids from the central conduit and the use of a relatively large diameter vessel as the containment vessel. In these arrangements the initial stage of separation is typically followed by a second more complete separation of solids from gases in a traditional cyclone vessel.

U.S. Pat. No. 5,565,020, the contents of which is hereby incorporated by reference, describes a cyclonic separation method and apparatus which discharges particulate solids and gaseous fluids into a separation vessel from a discharge opening of a central conduit and withdraws separated gaseous fluids from the separation vessel with a recovery conduit having an inlet located below the discharge opening. Recovery of separated gases using cyclonic separation is enhanced by the specific location of the recovery piping inlet which reduces the entrainment of fine particles with the gases.

Currently, many FCC units are being designed wherein a portion of a stripped catalyst (~538° C.) is directed through a recycle catalyst standpipe to a chamber where it is combined with a hot regenerated catalyst (~704° C.). A lower contact temperature between the combined catalyst and raw oil feed results in higher product selectivity with less dry gas and coke production, and a substantial increase in conversion due to the higher riser catalyst-to-oil ratio. Similar to a conventional FCC unit, the balance of the carbonized catalyst that is not recycled travels through the stripper to the regenerator where the coke is burned off before it returns to the base of the riser. The catalyst flowing to the regenerator carries a higher coke content, which in turn raises the regenerator temperature and enables the easing of constraints in the system.

In some situations, the catalyst load to the riser may increase significantly, essentially doubling. Thus, the catalyst loading to the cyclones and catalyst losses may double. In order to lower the catalyst losses, catalyst loading to the cyclones needs to be decreased Therefore, there is a need to increase the efficiency of the separation method and apparatus.

The present invention is provided to solve the problems discussed above and other problems, and to provide advantages and aspects not provided by prior processes of this type. A full discussion of the features and advantages of the present invention is deferred to the following detailed description, which proceeds with reference to the accompanying drawings.

SUMMARY OF THE INVENTION

One aspect of the present invention is directed to an apparatus for separating solid particles from a stream comprising a mixture of gaseous fluids and solid particle. The apparatus comprises a separation vessel. A mixture conduit extends vertically into the separation vessel and defines a discharge opening located within the separation vessel and is tangentially oriented for discharging the stream into an open interior of the separation vessel and imparts a tangential velocity to the stream. A particle outlet is defined by the separation vessel for discharging particles from a lower portion of the separation vessel. A gas recovery conduit within the vessel comprises an inlet and an intermediate portion. The inlet is for withdrawing gaseous fluids from within the open interior of the separation vessel at a location below the discharge opening and is radially offset from the mixture conduit. The intermediate portion is located above the inlet within the separation vessel and has a diameter greater than a diameter of the inlet.

The first aspect of the present invention may include one or more of the following features, alone or in any reasonable combination. An upper portion of the gas recovery conduit may have a diameter less than the diameter of the intermediate portion. The intermediate portion may be defined by an upper portion of the separation vessel. The intermediate portion of the gas recovery conduit may comprise a radially outwardly extending annular flange. The radially outwardly extending annular flange may join the inlet with the separation vessel. The radially outwardly extending annular flange may be substantially perpendicular to a vertical axis. The radially outwardly extending annular flange may extend radially outwardly and upwardly relative to the inlet. The radially outwardly extending annular flange may extend radially outwardly and upwardly from the inlet at an angle greater than or equal to 45° as measured from a vertical axis. The radially outwardly extending annular flange may have a perforated surface. The apparatus may further comprise: a gap between the mixture conduit and the separation vessel.

A second aspect of the present invention is also directed to an apparatus for separating solid particles from a stream comprising a mixture of gaseous fluids and solid particles. The apparatus comprises a separation vessel. A mixture conduit extends vertically into the separation vessel and defines a discharge opening located within the separation vessel and is tangentially oriented for discharging the stream into an open interior of the separation vessel and imparts a tangential velocity to the stream. The mixture conduit comprises an upper segment joined to a lower segment by an annular slip joint wherein the upper and lower segments are capable of relative vertical displacement within the separation vessel. A particle outlet is defined by the separation vessel for discharging particles from a lower portion of the separation vessel. A gas recovery conduit defines an inlet for withdrawing gaseous fluids from within the open interior of the separation vessel.

The second aspect of the invention may include one or more of the following features, alone or in any reasonable combination. The gas recovery inlet may be positioned at a location below the discharge opening and radially offset from the mixture conduit. The separation vessel may have an uppermost vertical extent located below an uppermost vertical extent of the mixture conduit. The apparatus may further comprise an annular gap between the mixture conduit and the separation vessel. The gas recovery conduit may emerge from the separation vessel at vertical extent of a radially outwardly extending discharge arm of the mixture conduit.

A third aspect of the present invention is also directed to an apparatus for separating solid particles from a stream comprising a mixture of gaseous fluids and solid particles. The apparatus comprises a separation vessel. A mixture conduit extends vertically into the separation vessel and defines a discharge opening located within the vessel and tangentially oriented for discharging the stream into an open interior of the vessel and imparts a tangential velocity to the stream. A gap is formed between the mixture conduit and the separation vessel. A particle outlet is defined by the separation vessel for discharging particles from a lower portion of the vessel. A gas recovery conduit comprises an inlet for withdrawing gaseous fluids from within the open interior of the separation vessel at a location below the discharge opening and radially offset from the mixture conduit.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

The apparatus of this invention comprises a separation vessel into which a mixture conduit that contains the mixture of solid particles transported by a gaseous fluid discharges the particles and gaseous fluid mixture. The separation vessel is preferably a cylindrical vessel. The cylindrical vessel promotes the swirling action of the gaseous fluids and solids as they are discharged tangentially from a discharge opening of the mixture conduit into the separation vessel. The separation vessel will preferably have an open interior below the discharge opening that will still provide satisfactory operation in the presence of some obstructions such as conduits or other equipment which may pass through the separation vessel.

The discharge opening and the conduit portion upstream of the discharge opening are constructed to provide a tangential velocity to the exiting mixture of gaseous fluids and solids. The discharge opening may be defined using vanes or baffles that will impart the necessary tangential velocity to the exiting gaseous fluids and solids. Preferably, the discharge outlet is constructed with conduits or arms that extend outwardly from a central mixture conduit. Providing a section of curved arm upstream of the discharge conduit will provide the necessary momentum to the gaseous fluids and solids as they exit the discharge opening to continue in a tangential direction through the separation vessel. The separation vessel has an arrangement that withdraws catalyst particles from the bottom of the vessel so that the heavier solid particles disengage downwardly from the lighter gaseous fluids. The bottom of the separator vessel may be completely open to permit solid particles to fall freely from the separation vessel or a bed of solid particles may be maintained at the bottom of the separation vessel.

A feature of this invention is reduction or elimination of stagnant areas in the separation vessel. Prior apparatuses of this type are prone to coke formation due to the large amount of stagnant vapor space at the top of the disengager. The present invention is intended to address this problem by reducing or eliminating any stagnant areas in the apparatus that are prone to coke formation.

Figure 1:
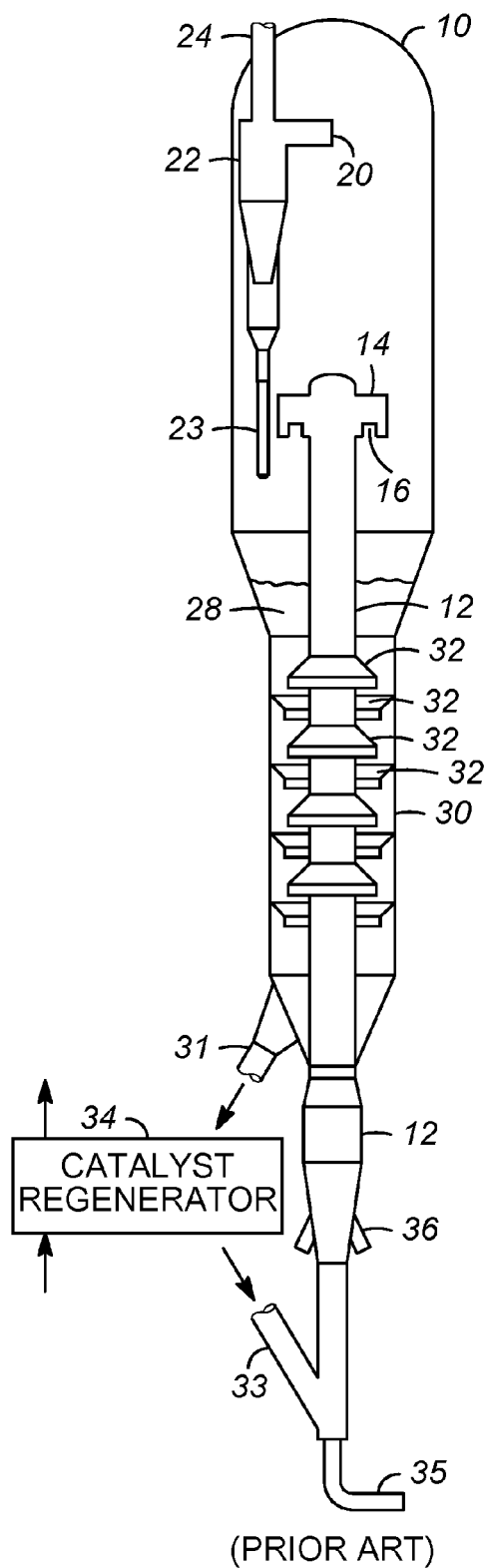
FIG. 1 is a sectional elevation of a prior art FCC reactor vessel schematically showing a separation vessel arranged in accordance with this invention.

Referring to FIG. 1, the schematic illustration depicts a separation arrangement in a reactor vessel 10. A central conduit in the form of a reactor riser 12 extends upwardly from a lower portion of the vessel 10 in a typical FCC arrangement. The central conduit or riser preferably has a vertical orientation within the separation vessel and may extend upwardly from the bottom of the separation vessel or downwardly from the top of the separation vessel. Riser 12 terminates in an upper portion of reactor vessel 10 with a conduit in the form of an arm 14. Arm 14 discharges a mixture of gaseous fluids and solid particles comprising catalyst. In a reactor arrangement as depicted by FIG. 1 the gaseous fluid comprises product vapors.

Gases and catalyst discharge from a discharge opening 16. The gases, having a lower density than the solids, more easily change direction and move upward into the cyclone inlet 20. Inlet 20 recovers gases from the discharge conduit as well as stripping vapors which are hereinafter described. The loading of catalyst particles in the gases entering cyclone inlet 20 are usually less than 1 lb/ft$^3$ (0.01 kg m$^3$) and typically less than 0.1 lb/ft$^3$ (0.001 kg m$^3$).

The separated gases pass into a cyclone 22 through inlet 20 that effects a further removal of particulate material from the gases in the gas recovery conduit. Cyclone 22 operates as a conventional cyclone in a conventional manner with the tangential entry of the gases creating a swirling action inside the cyclones to establish the well-known inner and outer vortexes that separate catalyst from gases. A gaseous stream relatively free of catalyst particles exits the reactor vessel 10 through an outlet 24.

Catalyst recovered by cyclone 22 exits the bottom of the cyclone through a dip-leg conduit 23 and passes through a lower portion of the reactor vessel 10 where it collects with catalyst from the discharge opening 16 in a catalyst bed 28. Catalyst from catalyst bed 28 passes downwardly through a stripping vessel 30 where countercurrent contact with a stripping fluid through a series of stripping baffles 32 displaces product gases from the catalyst as it continues downwardly through the stripping vessel.

Stripped catalyst from stripping vessel 30 passes through a conduit 31 to a catalyst regenerator 34 that rejuvenates the catalyst by contact with an oxygen-containing gas. High temperature contact of the oxygen-containing gas with the catalyst oxidizes coke deposits from the surface of the catalyst. Following regeneration catalyst particles enter the bottom of reactor riser 12 through a conduit 33 where a fluidizing gas from a conduit 35 pneumatically conveys the catalyst particles upwardly through the riser. As the mixture of catalyst and conveying gas continues up the riser, nozzles 36 inject feed into the catalyst, the contact of which vaporizes the feed to provide additional gases that exit through discharge opening 16 in the manner previously described.

Figure 2:
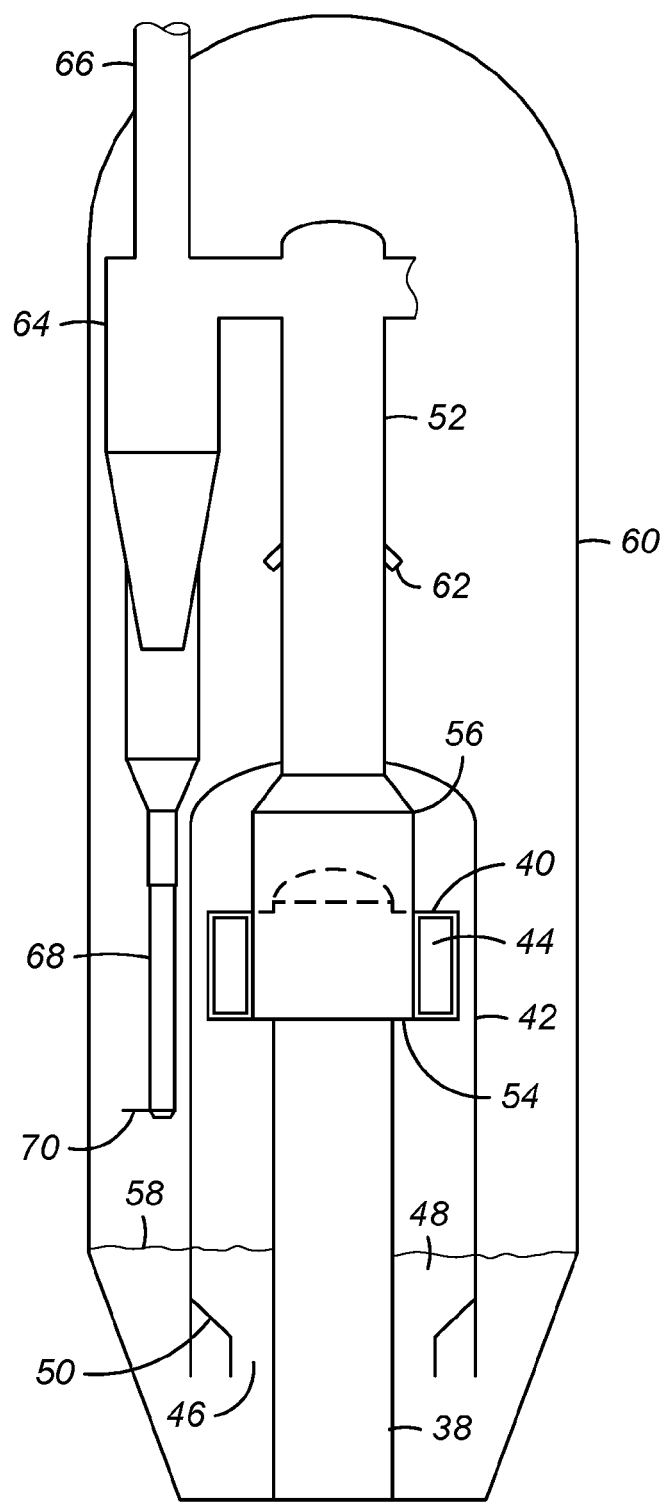
FIG. 2 shows an upper section of an FCC reactor vessel making use of a separation vessel.

In the arrangement depicted in FIG. 1, reactor vessel 10 serves as both a separation vessel and a containment vessel for the process overall. FIG. 2 depicts a modified arrangement wherein a separate containment vessel and separation vessel are provided. Looking then at FIG. 2, a central mixture conduit in the form of a reactor riser 38 delivers a mixture of catalyst particles and gases to arms 40 that tangentially discharge the mixture of catalyst particles and gases into a separation vessel 42 through discharge openings 44. The tangential delivery of the mixture of catalyst particles and gases effects separation in the manner previously described with the catalyst particles passing downwardly through the separation vessel 42 and out of a lower portion of the separation vessel, through a particle outlet 46. Prior to passing through outlet 46, catalyst collects in a bed 48 contained within the separation vessel 42. An initial displacement of gases comprising product hydrocarbons may be effected in bed 48 by contact with a stripping fluid. In the arrangement of FIG. 2, stripping fluid is delivered to the underside of a baffle 50 and may pass through a series of holes in baffle 50 (not shown).

Gas recovery conduit 52 withdraws gases comprising product hydrocarbons and stripping medium from the separation vessel at a location below discharge openings 44 through an annular inlet 54 defined by a shroud 56 that shrouds the end portion of riser 38 to a location below discharge openings 44. Holes provided in the sides of shroud 56 provide slots through which arms 40 pass. The structure of shroud 56 and arms 40 again provide the preferred structure wherein the gases and catalyst are discharged at a radial distance from the center of riser 38 that is greater than the distance from inlet 54 such that the gases containing a lower concentration of catalyst are removed closer to the center of the separation vessel 42 and riser 38. Additional stripping takes place below separation vessel 42 and stripping fluid passes upwardly across a bed surface 58 within the separation vessel 42.

A reactor vessel 60 serves as a containment vessel that houses the separation vessel 42 and also confines gases passing across bed surface 58. Gases in the upper volume of reactor vessel 60 enter the gas recovery conduit 52 through a series of ports 62. The combined stream of separated gases from inlet 54 and additional stripping fluid and gases from port 62 pass upwardly through recovery conduit 52 and into a traditional cyclone separator 64 that again effects a further separation of the remaining catalyst that is still entrained with the gases. Gases exit the top of cyclone 64 through an outlet 66 while recovered catalyst particles pass downwardly through a dip-leg conduit 68 at a rate regulated by a flapper valve 70. Catalyst from dip-leg conduit 68 as well as bed 48 pass out of the reactor vessel for stripping in the manner previously described.

Figure 5:
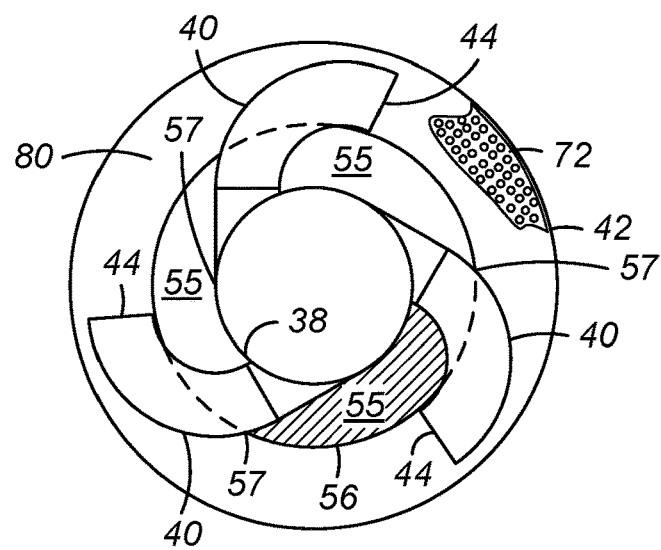
FIG. 5 is a section view of FIG. 4 showing a plan view of a separation arrangement of this invention.

The separation vessel and recovery conduit arrangement of FIG. 2 uses shroud 56 to provide the inlet 54 having a plurality of openings 55 (see, e.g., FIG. 5). Shroud 56 surrounds riser 38 to provide the openings 55 circumferentially arranged about the riser 38. Arms 40 extend out through the sides of shroud 56 via slots at reference number 57 (see, e.g., FIG. 5). The slotted arrangement allows for differential expansion of riser 38 relative to the shroud and arm 40.

Referring to FIGS. 3-11, openings 55 are created by a combination of arms 40 and shroud 56. Each opening 55 has an area that is shown shaded in FIGS. 5, 8, and 11. These areas can be varied by varying the diameters of riser 38 and shroud 56, as well as the shape of arms 40.

Figure 3:
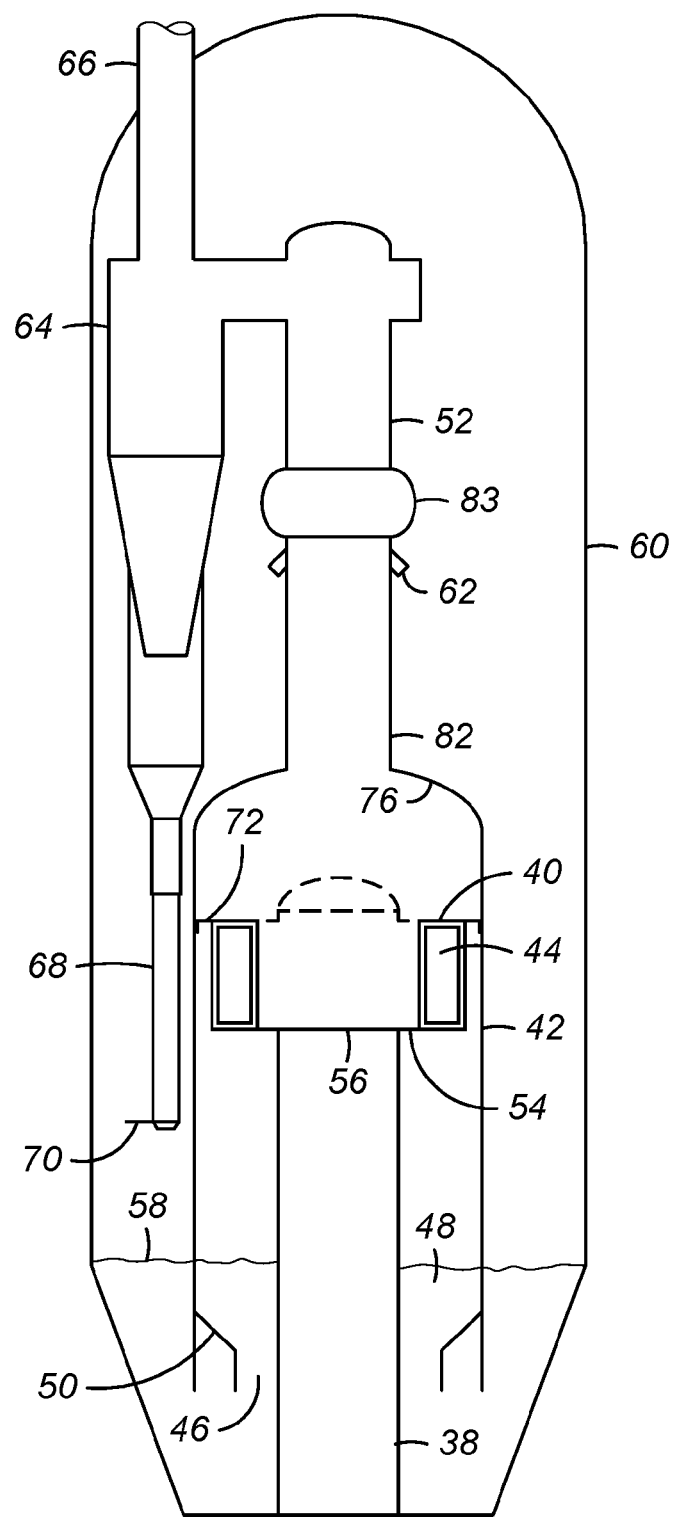
FIG. 3 shows a modification to the upper section of the FCC reactor vessel of FIG. 2.
Figure 4:
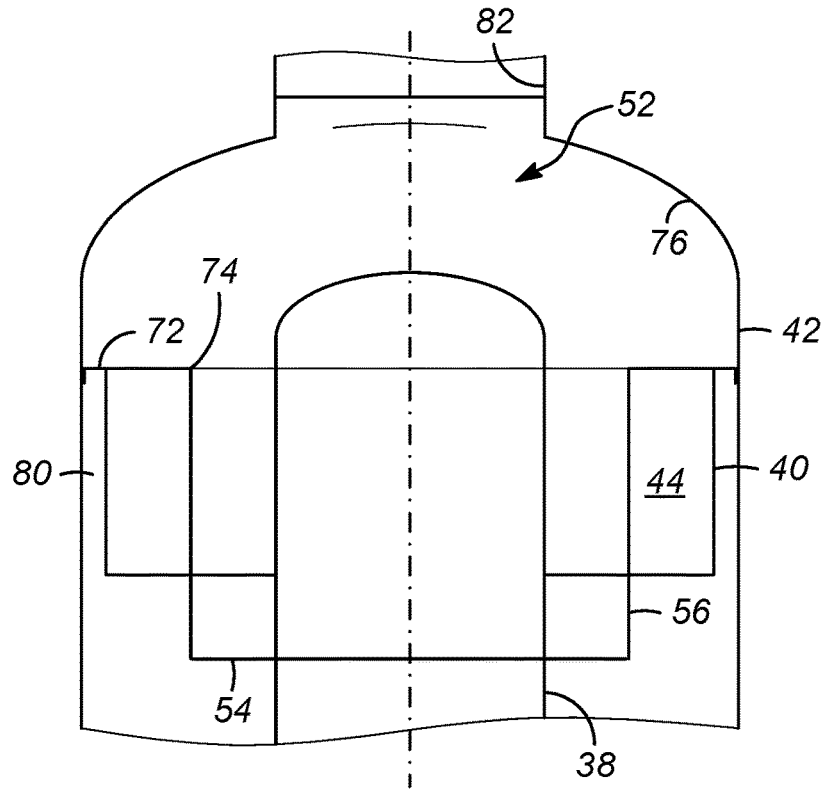
FIG. 4 shows a modification to the upper section of the FCC reactor vessel of FIG. 3.

Referring specifically to FIGS. 3-5, the recovery conduit 52 is modified to reduce a stagnant volume in the separation vessel 42 above the riser 38. Shroud 56 includes a radially outwardly extending annular flange 72. The placement and structure of the flange 72 effectively turns a volume of the separation vessel 42 above the riser into a portion of the recovery conduit 52, again, aimed at reducing a stagnant volume within the separation vessel 42. Flange 72 acts as a guide to riser 38 within the separation vessel 42 while allowing free vertical differential movement of riser 28 within the separation vessel 42.

In FIGS. 3-5, inlet 54, having openings 55, is located below the discharge openings 44 of arms 40. A diameter of inlet 54 defined by the shroud 56 is less than a diameter of separation vessel 42. An intermediate portion 76 of the recovery conduit 52 has a diameter that is substantially greater than the diameter of inlet 54. The expanded diameter is owed to flange 72 extending outwardly from shroud 56. Flange 72 is at least substantially sealed with and extends radially outwardly from a lip 74 at an upper portion of shroud 56 and is capable of relative vertical displacement with a radially inner surface of separation vessel 42, while remaining capable of relative vertical movement therewith. In this embodiment, flange 72 has a surface that is substantially perpendicular to a vertical axis, such that intermediate portion 76 is defined by an upper portion of separation vessel 42.

As illustrated in FIGS. 3-5 an upper portion 82 of recovery conduit 52 has a diameter substantially less than the diameter of intermediate portion 76. The diameter of intermediate portion 76 decreases by following the inner surface of separation vessel 42 until it merges with upper portion 82 at an uppermost portion of separation vessel 42. Upper portion 82 of recovery conduit 52 has a slip joint, or more preferably, an expansion element or joint 83.

Alternatively, or additionally, flange 72 may be outfitted with perforations to allow any solids reaching the recovery conduit to be transported therefrom.

Figure 6:
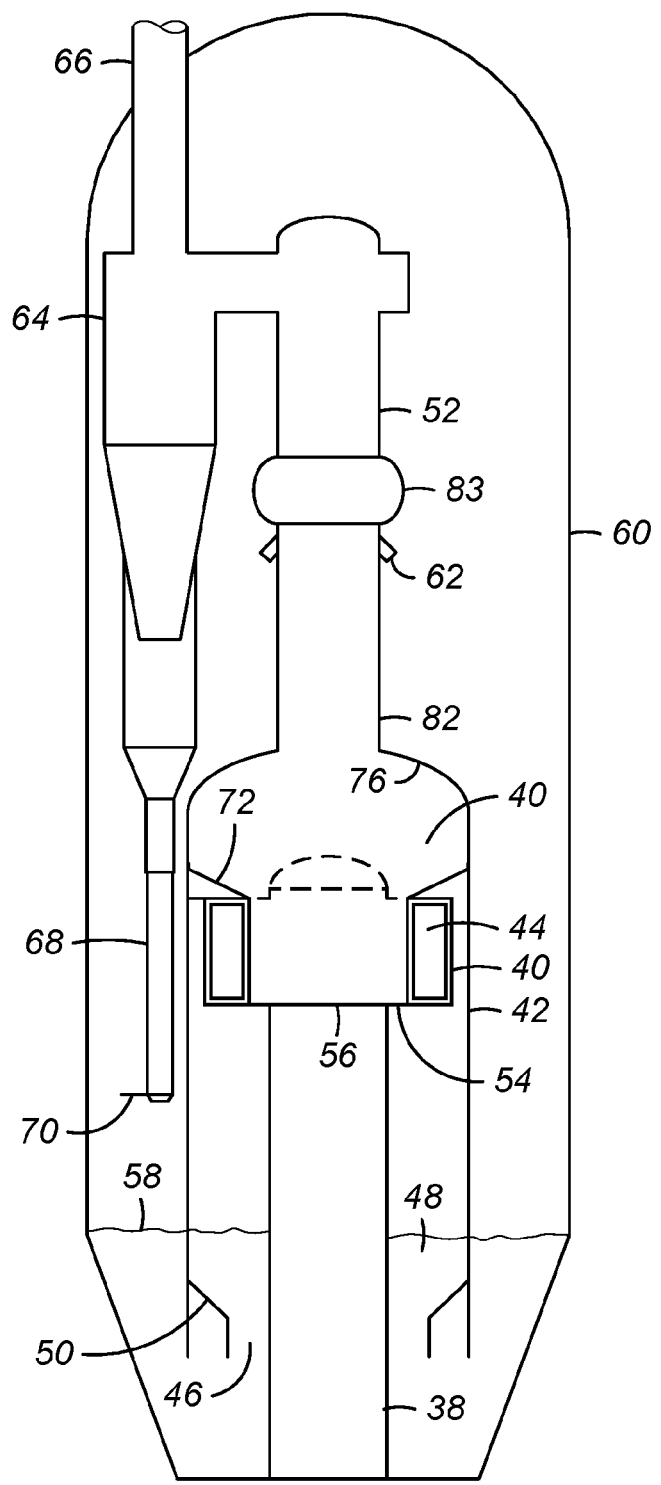
FIG. 6 shows a modification to the upper section of the FCC reactor vessel of FIG. 2.
Figure 7:
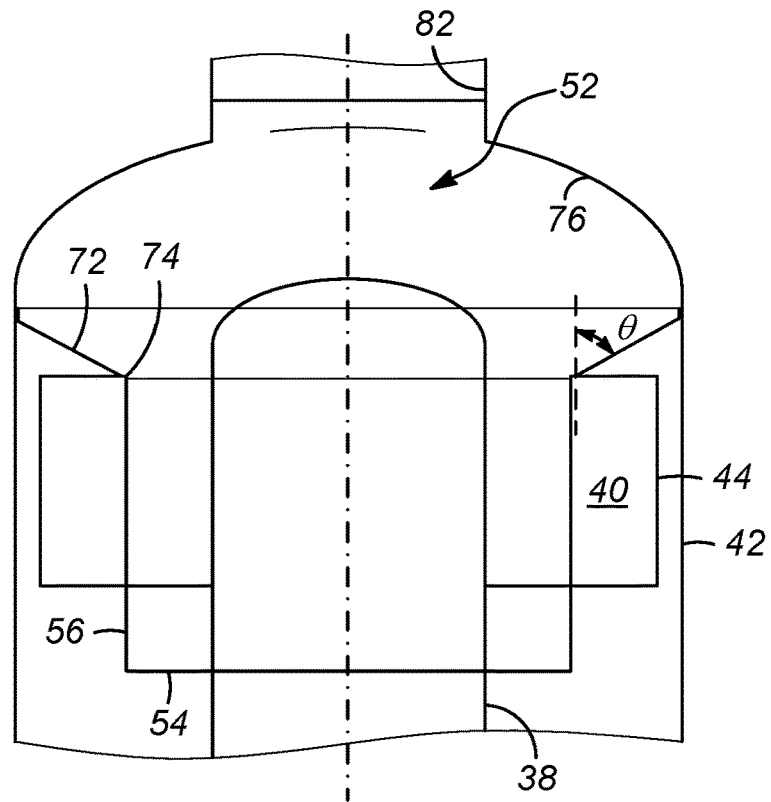
FIG. 7 shows a modification to the upper section of the FCC reactor vessel of FIG. 6.
Figure 8:
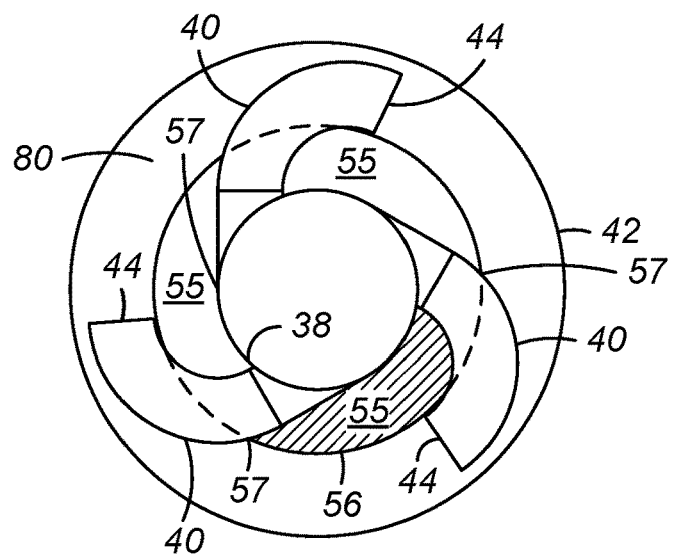
FIG. 8 is a section view of FIG. 7 showing a plan view of a separation arrangement of this invention.

An embodiment illustrated in FIGS. 6-8 is a variation of the previous embodiment. According to the embodiment illustrated in FIGS. 6-8, flange 72 extends radially outwardly and upwardly relative to the lip 74 and inlet 54 of shroud 56. An angle θ of flange 72 is preferably chosen to be greater than or equal to an angle of repose of particles that would have a tendency to collect on the surface of flange 72. Accordingly, the angle θ is typically greater than or equal to 45° as measured from a vertical axis.

Figure 9:
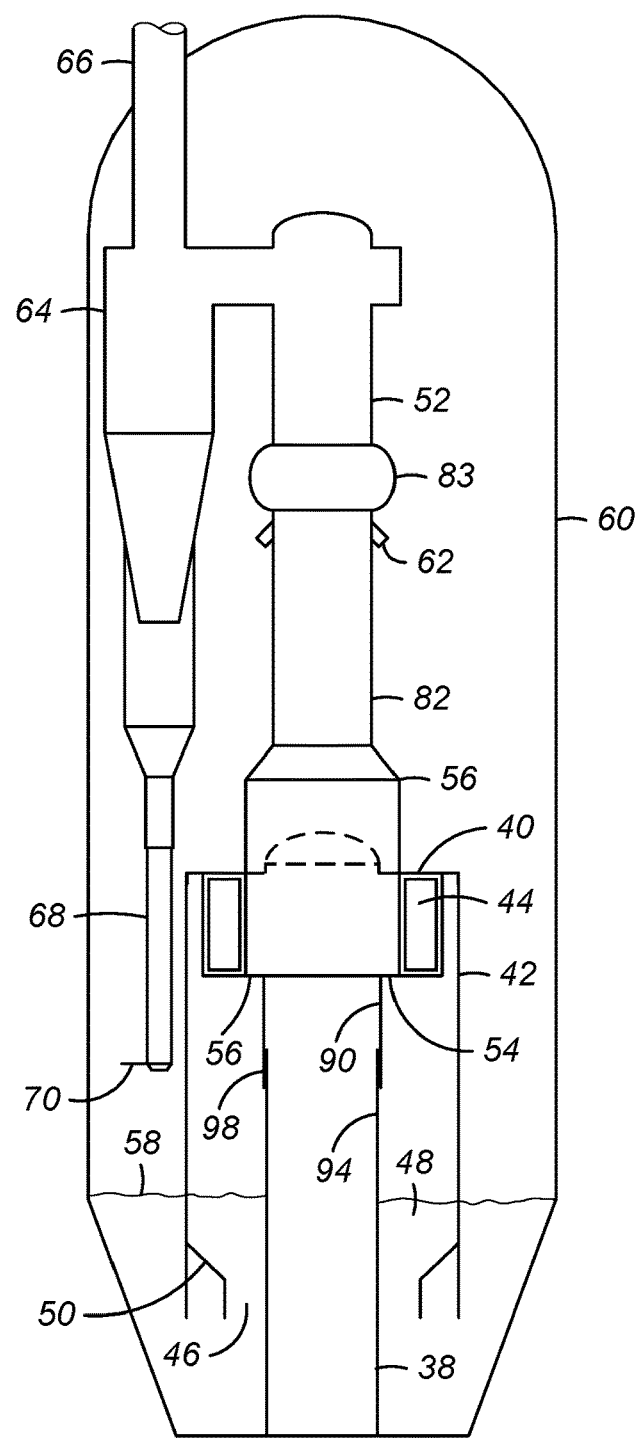
FIG. 9 shows a modification to the upper section of the FCC reactor vessel of FIG. 2.
Figure 10:
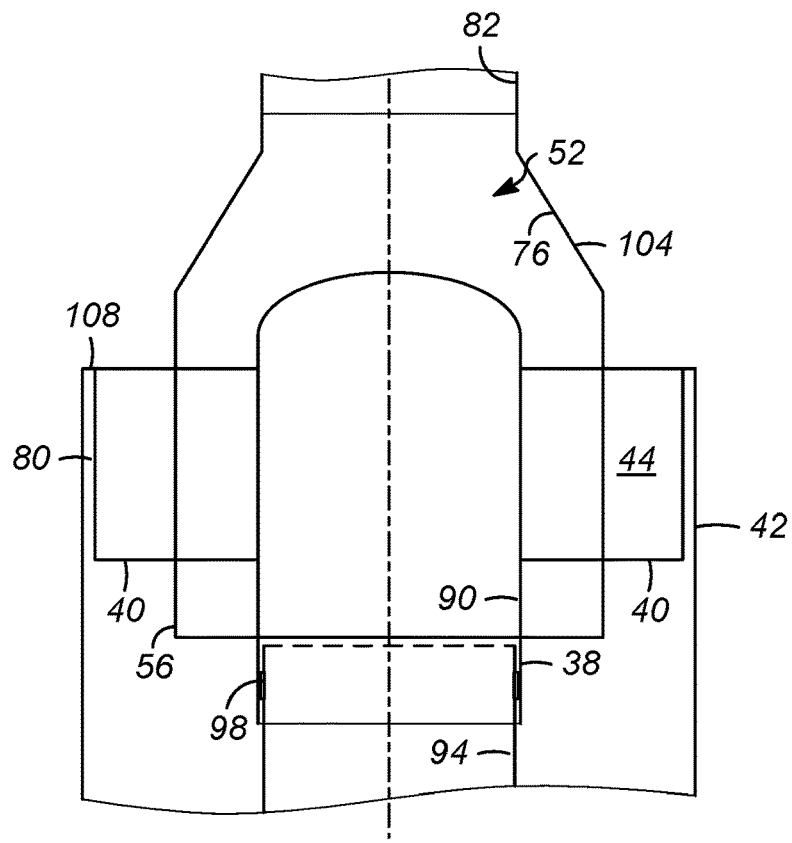
FIG. 10 shows a modification to the upper section of the FCC reactor vessel of FIG. 9.
Figure 11:
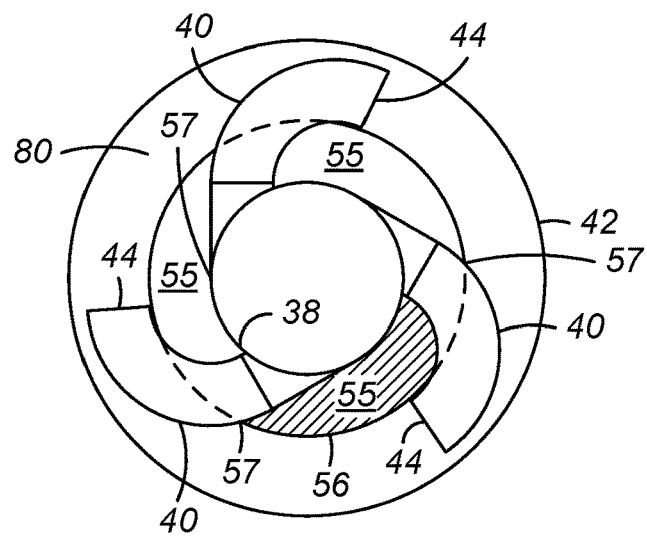
FIG. 11 is a section view of FIG. 10 showing a plan view of a separation arrangement of this invention.

Yet another embodiment is illustrated in FIGS. 9-11, reactor riser 38 extends upwardly within separation vessel 42. The riser 38 has an upper segment 90 including arms 40 and discharge openings 44. A lower segment 94 is located below upper segment 90. Upper and lower segments 90, 94 are joined by annular slip joint 98. Slip joint 98 allows relative vertical displacement within separation vessel 42 by lower segment 94 of riser 38.

Instead of gapping flange 72 to separation chamber 42, the slip joint 98 allows for a rigid (welded) connection (see FIGS. 9-11) between flange 72 and separation vessel 42, but this will require slip joint 98 in the riser 38. Riser 38 grows vertically up from its connection to the stripper bottom cone (a very long run of riser 38; see, e.g., FIG. 1) while separation vessel 42 grows up from the attachment to the upper reactor cone (not shown). Alternatively, separation vessel 42 can be hung from the cyclones and the axial thermal differential growth is even greater. Furthermore, slip joint 98 will guide expansion of the long relatively more flexible riser 38 just like flange 72 in the previous embodiments.

Expansion element 83 may be required (unless the separation chamber is hung from the cyclones). Lower slip joint 98 accommodates vertical thermal differential growth between the riser 38 and the separation vessel 42, not a vertical thermal differential growth between the separation vessel 42 and the cyclones.

Further to this embodiment, separation vessel 42 is truncated above arms 40. Separation vessel 42 has an uppermost vertical extent located below an uppermost vertical extent of riser 38. Shroud 56 extends upwardly beyond arms 40 so that shroud 56 emerges from separation vessel 42 at a vertical extent of arms 40. Shroud 56 has reducer segment, generally or typically a frustoconical segment 104, located above riser 38 to reduce a diameter of recovery conduit 52 as it extends upwardly. Annular flange 108 extends radially inwardly from a cylindrical wall of separation vessel 42 and is attached to shroud 56 above arms 40, preferably sealed therewith. An annular gap 80 located between shroud 56 and separation vessel 42 is substantially sealed by flange 108 at an upper end.

Generally, the invention described herein may be functional with a separation vessel 42 supported from the cyclones above the separation vessel 42, as illustrated; additionally, the invention may also be functional when the separation vessel 42 is supported from below if an expansion element 83 is employed.

More specifically, in one example, there are three assemblies: (1) riser 38 is fixed at its base at a lower stripper cone (high upward vertical growth); (2) separation vessel 42 is fixed at the reactor cone (low upward vertical growth), and (3) the cyclone assembly (including a plenum, cyclones and upper outlet pipe 66) is fixed to vessel 60 at the top of the reactor at the plenum connection (vertical downward growth). In this example, assembly (1) cannot be rigidly attached to assembly (2). Therefore, flange 72 must be movable within separation chamber 42 to allow vertical differential growth. Alternatively, if the flange is rigidly fixed to separation vessel 42, for example flange 108 in the embodiment of FIGS. 9-11, then riser 38 must have a slip joint, for example slip joint 98. If the slip joint is employed then the separation outlet assembly is supported from the separation vessel 38 as compared to the riser 38.

It should be noted that assemblies (2) and (3) can be connected to the reactor vessel 60 and to each other if an expansion element is used in the outlet pipe to accommodate the vertical differential movement, or assembly (2) can be hung from and supported by assembly (3) (i.e. assembly (2) not attached to reactor vessel 60) with no expansion element required.

Specific Embodiments

While the following is described in conjunction with specific embodiments, it will be understood that this description is intended to illustrate and not limit the scope of the preceding description and the appended claims.

A first embodiment of the invention is an apparatus for separating solid particles from a stream comprising a mixture of gaseous fluids and solid particles, the apparatus comprising a separation vessel; a mixture conduit extending vertically into the separation vessel and defining a discharge opening located within the separation vessel and tangentially oriented for discharging the stream into an open interior of the separation vessel and imparting a tangential velocity to the stream; a particle outlet defined by the separation vessel for discharging particles from a lower portion of the separation vessel; and a gas recovery conduit comprising an inlet for withdrawing gaseous fluids from within the open interior of the separation vessel at a location below the discharge opening and radially offset from the mixture conduit; and an intermediate portion located above the inlet within the separation vessel having a diameter greater than a diameter of the inlet. An embodiment of the invention is one, any or all of prior embodiments in this paragraph up through the first embodiment in this paragraph wherein an upper portion of the gas recovery conduit has a diameter less than the diameter of the intermediate portion. An embodiment of the invention is one, any or all of prior embodiments in this paragraph up through the first embodiment in this paragraph wherein the intermediate portion is defined by an upper portion of the separation vessel. An embodiment of the invention is one, any or all of prior embodiments in this paragraph up through the first embodiment in this paragraph wherein the intermediate portion of the gas recovery conduit comprises a radially outwardly extending annular flange. An embodiment of the invention is one, any or all of prior embodiments in this paragraph up through the first embodiment in this paragraph wherein the radially outwardly extending annular flange joins the inlet with the separation vessel. An embodiment of the invention is one, any or all of prior embodiments in this paragraph up through the first embodiment in this paragraph wherein the radially outwardly extending annular flange is substantially perpendicular to a vertical axis. An embodiment of the invention is one, any or all of prior embodiments in this paragraph up through the first embodiment in this paragraph wherein the radially outwardly extending annular flange extends radially outwardly and upwardly relative to the inlet. An embodiment of the invention is one, any or all of prior embodiments in this paragraph up through the first embodiment in this paragraph wherein the radially outwardly extending annular flange extends radially outwardly and upwardly from the inlet at an angle greater than or equal to 45° as measured from a vertical axis. An embodiment of the invention is one, any or all of prior embodiments in this paragraph up through the first embodiment in this paragraph wherein the radially outwardly extending annular flange has a perforated surface. An embodiment of the invention is one, any or all of prior embodiments in this paragraph up through the first embodiment in this paragraph further comprising a gap between the mixture conduit and the separation vessel. An embodiment of the invention is one, any or all of prior embodiments in this paragraph up through the first embodiment in this paragraph wherein the radially outwardly extending annular flange acts as a guide to the mixing conduit within the separation vessel while allowing free vertical differential movement of the mixing conduit within the separation vessel.

A second embodiment of the invention is an apparatus for separating solid particles from a stream comprising a mixture of gaseous fluids and solid particles, the apparatus comprising a separation vessel; a mixture conduit extending vertically into the separation vessel and defining a discharge opening located within the separation vessel and tangentially oriented for discharging the stream into an open interior of the separation vessel and imparting a tangential velocity to the stream wherein the mixture conduit comprises an upper segment joined to a lower segment by an annular slip joint wherein the upper and lower segments are capable of relative vertical displacement within the separation vessel; a particle outlet defined by the separation vessel for discharging particles from a lower portion of the separation vessel; and a gas recovery conduit defining an inlet for withdrawing gaseous fluids from within the open interior of the separation vessel. An embodiment of the invention is one, any or all of prior embodiments in this paragraph up through the second embodiment in this paragraph wherein the gas recovery inlet is positioned at a location below the discharge opening and radially offset from the mixture conduit. An embodiment of the invention is one, any or all of prior embodiments in this paragraph up through the second embodiment in this paragraph wherein the separation vessel has an uppermost vertical extent located below an uppermost vertical extent of the mixture conduit. An embodiment of the invention is one, any or all of prior embodiments in this paragraph up through the second embodiment in this paragraph further comprising an annular gap between the gas recovery conduit and the separation vessel. An embodiment of the invention is one, any or all of prior embodiments in this paragraph up through the second embodiment in this paragraph wherein the gas recovery conduit emerges from the separation vessel at a vertical extent of a radially outwardly extending discharge arm of the mixture conduit.

A third embodiment of the invention is an apparatus for separating solid particles from a stream comprising a mixture of gaseous fluids and solid particles, the apparatus comprising a separation vessel; a mixture conduit extending vertically into the separation vessel and defining a discharge opening located within the separation vessel and tangentially oriented for discharging the stream into an open interior of the separation vessel and imparting a tangential velocity to the stream; a gap formed between the mixture conduit and the separation vessel; a particle outlet defined by the separation vessel for discharging particles from a lower portion of the separation vessel; a gas recovery conduit comprising an inlet for withdrawing gaseous fluids from within the open interior of the separation vessel at a location below the discharge opening and radially offset from the mixture conduit; and wherein the gap is substantially sealed to isolate the gas recovery conduit from the gap.

A fourth embodiment of the invention is an apparatus for separating solid particles from a stream comprising a mixture of gaseous fluids and solid particles, the apparatus comprising a separation vessel; a mixture conduit extending vertically into the separation vessel and defining a discharge opening located within the separation vessel and tangentially oriented for discharging the stream into an open interior of the separation vessel and imparting a tangential velocity to the stream; a particle outlet defined by the separation vessel for discharging particles from a lower portion of the separation vessel; a gas recovery conduit comprising an inlet for withdrawing gaseous fluids from within the open interior of the separation vessel at a location below the discharge opening and radially offset from the mixture conduit; and a radially outwardly extending annular flange extending between the gas recovery conduit and the separation vessel. An embodiment of the invention is one, any or all of prior embodiments in this paragraph up through the first embodiment in this paragraph wherein the radially outwardly extending flange acts as a guide to the mixing conduit within the separation vessel while allowing free vertical differential movement of the mixing conduit within the separation vessel. An embodiment of the invention is one, any or all of prior embodiments in this paragraph up through the first embodiment in this paragraph wherein the radially outwardly extending annular flange is substantially perpendicular to a vertical axis. An embodiment of the invention is one, any or all of prior embodiments in this paragraph up through the first embodiment in this paragraph wherein the radially outwardly extending flange closes a gap between the particle outlet and the separation vessel.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While the specific embodiments have been illustrated and described, numerous modifications come to mind without significantly departing from the spirit of the invention, and the scope of protection is only limited by the scope of the accompanying claims.

The invention claimed is:

1. An apparatus for separating solid particles from a stream comprising a mixture of gaseous fluids and solid particles, the apparatus comprising:
    a separation vessel;
    a mixture conduit extending vertically into the separation vessel and defining a discharge opening located within the separation vessel and tangentially oriented for discharging the stream into an open interior of the separation vessel and imparting a tangential velocity to the stream;
    a particle outlet defined by the separation vessel for discharging particles from a lower portion of the separation vessel; and
    a gas recovery conduit comprising:
        an inlet provided by a shroud for withdrawing gaseous fluids from within the open interior of the separation vessel at a location below the discharge opening and radially offset from the mixture conduit; and
        an intermediate portion located above the inlet within the separation vessel having a diameter greater than a diameter of the inlet and comprising a radially outwardly extending annular flange, said annular flange extending from said shroud and including a free end that acts as a guide to the mixing conduit within the separation vessel while allowing free vertical differential movement of the mixing conduit within the separation vessel.

2. The apparatus of claim 1 wherein an upper portion of the gas recovery conduit has a diameter less than the diameter of the intermediate portion.

3. The apparatus of claim 1 wherein the intermediate portion is defined by an upper portion of the separation vessel.

4. The apparatus of claim 1 wherein the radially outwardly extending annular flange joins the inlet with the separation vessel.

5. The apparatus of claim 1 wherein the radially outwardly extending annular flange is substantially perpendicular to a vertical axis.

6. The apparatus of claim 1 wherein the radially outwardly extending annular flange extends radially outwardly and upwardly relative to the inlet.

7. The apparatus of claim 1 wherein the radially outwardly extending annular flange extends radially outwardly and upwardly from the inlet at an angle greater than or equal to 45° as measured from a vertical axis.

8. The apparatus of claim 1 wherein the radially outwardly extending annular flange has a perforated surface.

9. The apparatus of claim 1 further comprising:
    a gap between the mixture conduit and the separation vessel.

10. An apparatus for separating solid particles from a stream comprising a mixture of gaseous fluids and solid particles, the apparatus comprising:
    a separation vessel;
    a mixture conduit extending vertically into the separation vessel and defining a discharge opening located within the separation vessel and tangentially oriented for discharging the stream into an open interior of the separation vessel and imparting a tangential velocity to the stream;
    a particle outlet defined by the separation vessel for discharging particles from a lower portion of the separation vessel;
    a gas recovery conduit comprising an inlet for withdrawing gaseous fluids from within the open interior of the separation vessel at a location below the discharge opening and radially offset from the mixture conduit; and
    a radially outwardly extending annular flange extending between the gas recovery conduit and the separation vessel substantially perpendicular to a vertical axis, said annular flange including a free end capable of relative vertical displacement with a radially inner surface of said separation vessel.

11. The apparatus of claim 10 wherein the radially outwardly extending flange acts as a guide to the mixing conduit within the separation vessel while allowing free vertical differential movement of the mixing conduit within the separation vessel.

12. The apparatus of claim 10 wherein the radially outwardly extending flange closes a gap between the particle outlet and the separation vessel.

* * * * *